United States Patent [19]

Tadahiro

[11] Patent Number: 4,920,755
[45] Date of Patent: May 1, 1990

[54] CONTROL APPARATUS FOR AUTOMOBILE AIR-CONDITIONERS

[75] Inventor: Takahashi Tadahiro, Konan, Japan

[73] Assignee: Diesel Kiki Co., Ltd., Tokyo, Japan

[21] Appl. No.: 356,369

[22] Filed: May 24, 1989

[30] Foreign Application Priority Data

Jun. 10, 1988 [JP] Japan .................................. 63-143203

[51] Int. Cl.⁵ .............................................. F28D 3/00
[52] U.S. Cl. .................................... 62/171; 62/176.6; 165/21
[58] Field of Search ............................ 62/171, 176.6 X; 236/44 R; 165/20, 21 X

[56] References Cited

U.S. PATENT DOCUMENTS 4,848,444  7/1989  Heinle et al. ....................... 62/176.6
4,852,363  8/1989  Kampf et al. ....................... 62/176.6

FOREIGN PATENT DOCUMENTS 0147913  9/1982  Japan ................................. 62/176.6

Primary Examiner—William E. Wayner
Attorney, Agent, or Firm—Wenderoth, Lind & Ponack

[57] ABSTRACT

A control apparatus for automobile air-conditioners includes a vehicle compartment humidity calculating unit for calculating a relative humidity in the vehicle compartment based on the relative humidity on the inside surface of the windshield of a motor vehicle, the temperature of the inside surface of the windshield and the vehicle compartment temperature. The results of calculation are used for the control of operation of the air-conditioner.

2 Claims, 8 Drawing Sheets

CONTROL APPARATUS FOR AUTOMOBILE AIR-CONDITIONERS

BACKGROUND OF THE INVENTION

1. Field of the Invention

The present invention relates to a control apparatus for automobile air conditioners for controlling the humidity of the air in a vehicle compartment.

2. Description of the Prior Art

When the air in a vehicle compartment becomes dry in winter, for example, the air-conditioner is controlled to operate a humidifier to increase the humidity of the air in the vehicle compartment. In this instance, windowpanes are likely to collect moisture due to over-humidification. In order to prevent the over humidification, the present assignee has proposed a control system such as disclosed in Japanese Patent Laid-open Publication No. 56-60716 wherein operation of the humidifier is stopped when a humidity sensor detects the humidity on the inside surface of the windowpane which is larger than a predetermined value.

Such on-off control of operation of the humidifier based on the humidity or moisture content on the inside surface of the windowpane, however, does not assure a control of operation of the humidifier which is well adapted to the relative humidity of the air in the vehicle compartment. As a result, a comfortable humidity control of the air in the vehicle compartment is difficult to achieve.

In view of the foregoing difficulty, an attempt may be made to provide a humidity sensor for detecting a relative humidity of the air in the vehicle compartment so as to control the humidity in the vehicle compartment in response to output signals from the relative humidity sensor. However, such attempt will be unsatisfactory because the humidity sensor is generally not responsive to a low humidity range and hence is incapable of achieving a wide-range humidity control of the air in the vehicle compartment.

SUMMARY OF THE INVENTION

It is therefore an object of the present invention to provide a control apparatus for automobile air-conditioners which is capable of achieving a wide-range humidity control of the air in a vehicle compartment.

According to a first aspect of the present invention, there is provided a control apparatus for an automobile air-conditioner, comprising: windowpane humidity detection means for detecting a relative humidity on the inside surface of a windowpane of a motor vehicle; mist judgment means for making a judgment, according to the output from the windowpane humidity detection means, to determine whether the inside surface of the windowpane is misted or not; windowpane temperature detection means for detecting a temperature of the inside surface of the windowpane; vehicle compartment temperature detection means for detecting a temperature of the air inside the vehicle compartment; vehicle compartment humidity calculation means for calculating a relative humidity in the vehicle compartment by conversion from the relative humidity on the inside surface of the windowpane, the temperature of the inside surface of the windowpane and the temperature of the air in the vehicle compartment; humidification demand judgment means for making a judgment as to whether the relative humidity calculated by the vehicle compartment humidity calculation means is lower than a predetermined humidity; and control means for controlling the air-conditioner to achieve a demist operation if the judgment by the mist judgment means indicates the misted state of the inside surface of the windowpane, and to achieve a humidifying operation if the judgment by the mist judgment means indicates the non-misted state of the inside surface of the windowpane and the judgment by the humidication demand judgment means indicates the relative humidity in the vehicle compartment which is lower than the predetermined humidity.

With this construction, the relative humidity in the vehicle compartment is calculated by conversion from the relative humidity on the inside surface of the windowpane, the temperature of the inside surface of the windowpane and the vehicle compartment temperature, so that a humidity control including a demist operation and a humidifying operation can be achieved reliably within a relatively wide range of humidity.

According to a second aspect of the present invention, there is provided a control apparatus for an automobile air-conditioner, comprising: vehicle compartment humidity detection means for detecting a relative humidity of the air in a vehicle compartment; a validity judgment means for making a judgment as to whether an output value from the vehicle compartment humidity detection means is in a valid detection range; windowpane humidity detection means for detecting a relative humidity on the inside surface of a windowpane of a motor vehicle; windowpane temperature detection means for detecting a temperature of the inside surface of the windowpane; vehicle compartment temperature detection means for detecting a temperature of the air inside the vehicle compartment; vehicle compartment humidity calculation means for calculating a relative humidity in the vehicle compartment by conversion from the relative humidity on the inside surface of the windowpane, the temperature of the inside surface of the windowpane and the vehicle compartment temperature; selection means for selecting the output value from the vehicle compartment humidity detecting means if the judgment by said validity judgment means indicates that the output from said vehicle compartment humidity detection means is in the valid detection range and for selecting the result of calculation by said vehicle compartment humidity calculation means if the judgment by the validity judgment means indicates that the output from the vehicle compartment humidity detection means is out of the valid detection range; and control means for controlling the air-conditioner control operation based on the result of selection by the selection means.

The humidity control of the vehicle compartment can be achieved based on the detected vehicle compartment humidity unless the humidity in the vehicle compartment drops to a certain low range in which a reliable humidity detection cannot be achieved.

DETAILED DESCRIPTION

The present invention will be described hereinbelow in greater detail with reference to certain preferred embodiments shown in the accompanying drawings.

Figure 1:
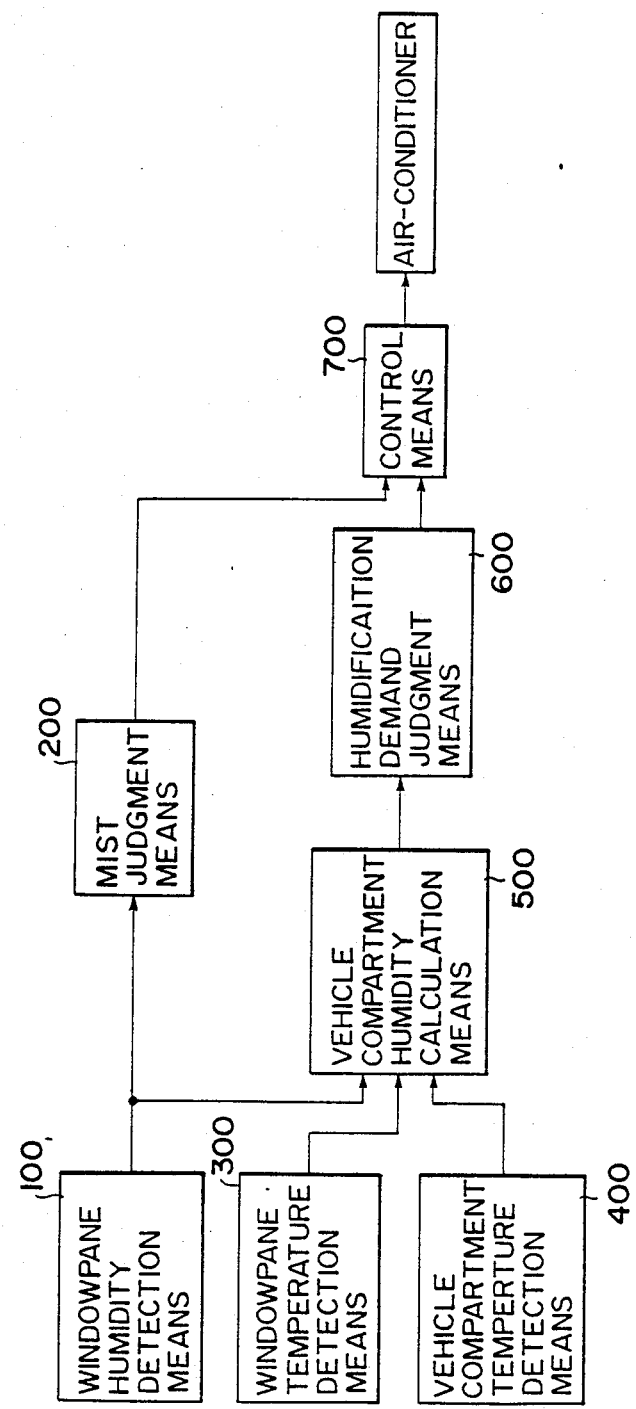
FIG. 1 is a block diagram showing the general construction of a control apparatus for automobile air-conditioner according to a first embodiment of the present invention.
Figure 2:
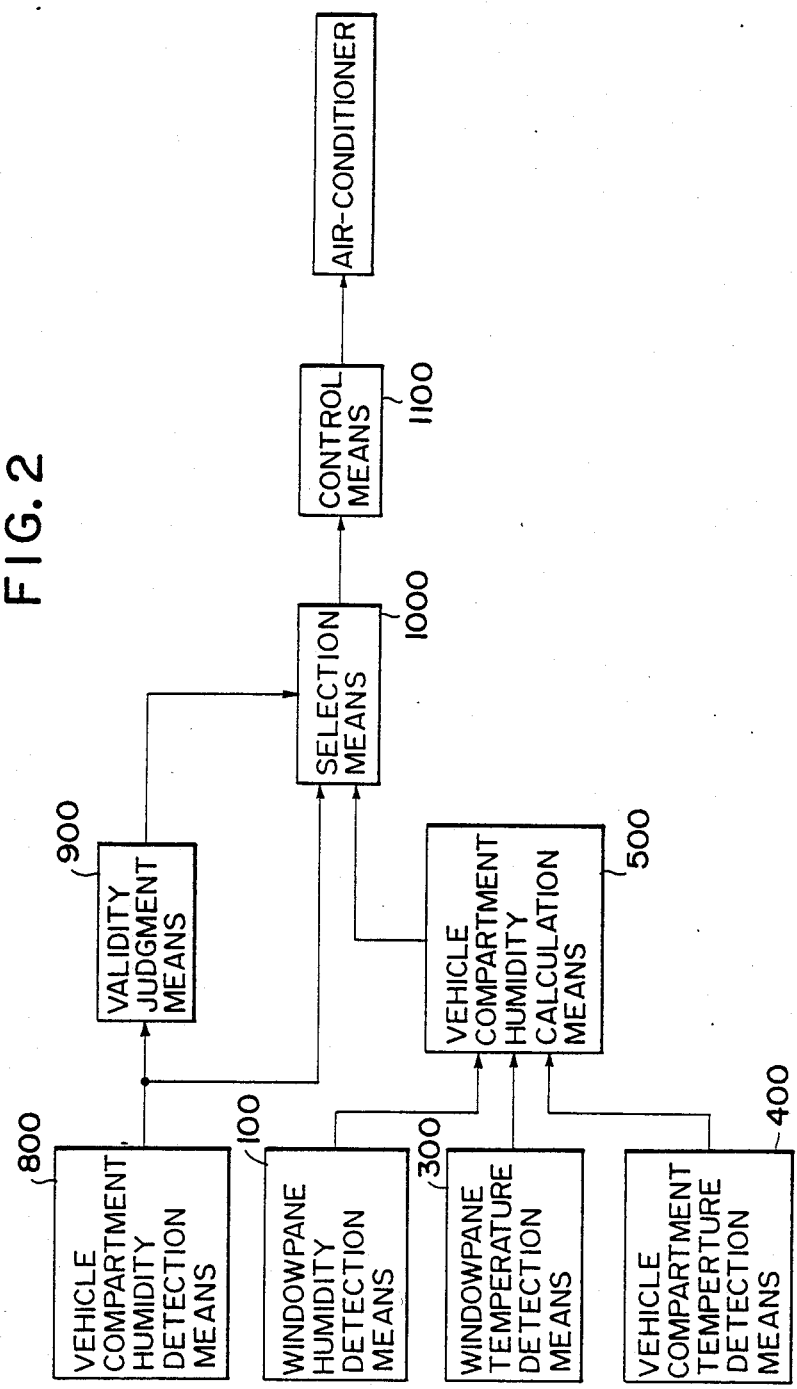
FIG. 2 is a block diagram illustrative of the general construction of a control apparatus for automobile air-conditioner according to a second embodiment of the present invention.
Figure 3:
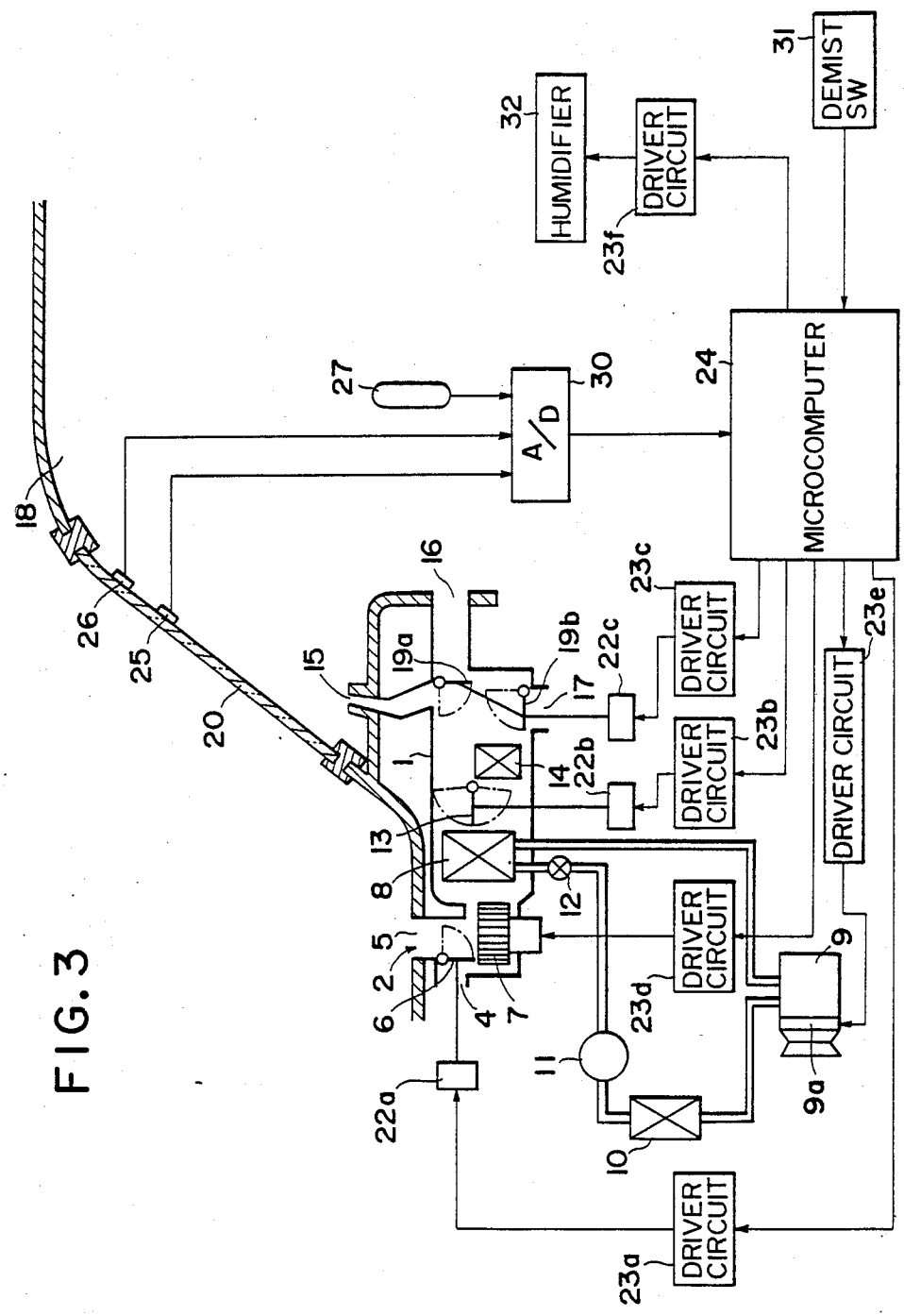
FIG. 3 is a diagrammatical view showing an automobile air-conditioner incorporating the control apparatus shown in FIG. 1.

As shown in FIG. 3, an automobile air-conditioner includes an airflow duct 1 having an intake door changeover device 2 at the upstream end thereof. The intake door changeover device 2 includes a selecting door 6 disposed at the junction between a recirculated air inlet 4 and an outlet air inlet 5 that are provided in bifurcated fashion. The selecting door 6 is operatively connected to an actuator 22a and driven by the latter to select one of the inlets 4, 5 for allowing the recirculated air or the outside air to be drawn into the duct 1.

A blower 7 is disposed in the duct 1 immediately downstream of the changeover device 2 to force the air to flow downstream through the duct 1. The duct 1 also includes an evaporator 8 and a heater core 14 disposed downstream of the blower 7 in the order named.

The evaporator 8 is connected in fluid circuit with a compressor 9, a condenser 10, a receiver tank 11 and an expansion valve 12 so as to constitute jointly therewith a refrigeration system achieving a refrigeration cycle. The compressor 9 includes an electromagnetic clutch 9a for selectively connecting the compressor 9 to an engine of a motor vehicle (neither shown). The electromagnetic clutch 9a is engaged and disengaged to undertake an on-off control of operation of the compressor 9.

The heater core 14 serves to heat the air passing thereover as the air takes up heat from an engine cooling water recirculating through the heater core 14. An air-mix door 13 is disposed between the evaporator 8 and the heater core 14 and operatively connected to an actuator 22b. The opening of the air-mix door 13 is regulated by the actuator 22b for adjustably varying the ratio of the amount of air flowing directly over the heater core 14 and the amount of air bypassing the heater core 14, so that the temperature of air to be exhausted or blown-off from the duct 1 is controlled at the desired value.

The duct 1 has at its downstream end a defrost outlet 15, a vent outlet 16 and a heat outlet 17 that are provided in branched fashion and all open to a vehicle compartment 18. There are two mode doors 19a, 19b disposed, respectively, at the junction between the defrost and vent outlets 15, 16 and at the junction between the vent and heat outlets 16, 17 for opening and closing the outlets 15–17. Operation of these mode doors 19a, 19b is controlled by an actuator 22c for selecting a desired mode of operation of the air-conditioner.

A windowpane humidity sensor 25 is disposed on the inside surface of a windshield 20 for detecting the humidity of a portion of the windshield 20 which is aligned with the defrost outlet 15. Likewise, a windowpane temperature sensor 26 is disposed on the inside surface of the windshield 20 for detecting the temperature of the inside surface of the windshield 20. Designated by 27 is a vehicle compartment temperature sensor for detecting the temperature of the air in the vehicle compartment 18. Output signals from the respective sensors 25 through 27 are inputted to an A/D converter 30 in which they are digitalized. Then the digitalized signals are supplied from the A/D converter 30 to a microcomputer 24. The microcomputer 24 is also supplied with the output signal from a demist switch 31 which is actuated when the demist control is to be achieved in a manual mode.

The microcomputer 24 is of the conventional type known per se and comprises a central processing unit (CPU), a read only memory (ROM), a random access memory (RAM), and an input/output port (I/O), neither shown. The microcomputer 24 is operative to calculate control signals based on the various input signals set forth above and deliver the control signals to the actuators 22a–22c, the compressor 9 and a motor of the blower 7 through respective driver circuits 23a–23e, so that the operation of the various doors 6, 13, 19a, 19b, the on-off operation of the compressor 9 and the rotation of the blower 7 are controlled. The microcomputer 24 further delivers a control signal through a driver circuit 23f to a humidifier 32 for controlling the operation of the humidifier 32 which is disposed in the vehicle compartment 18.

Figure 4:
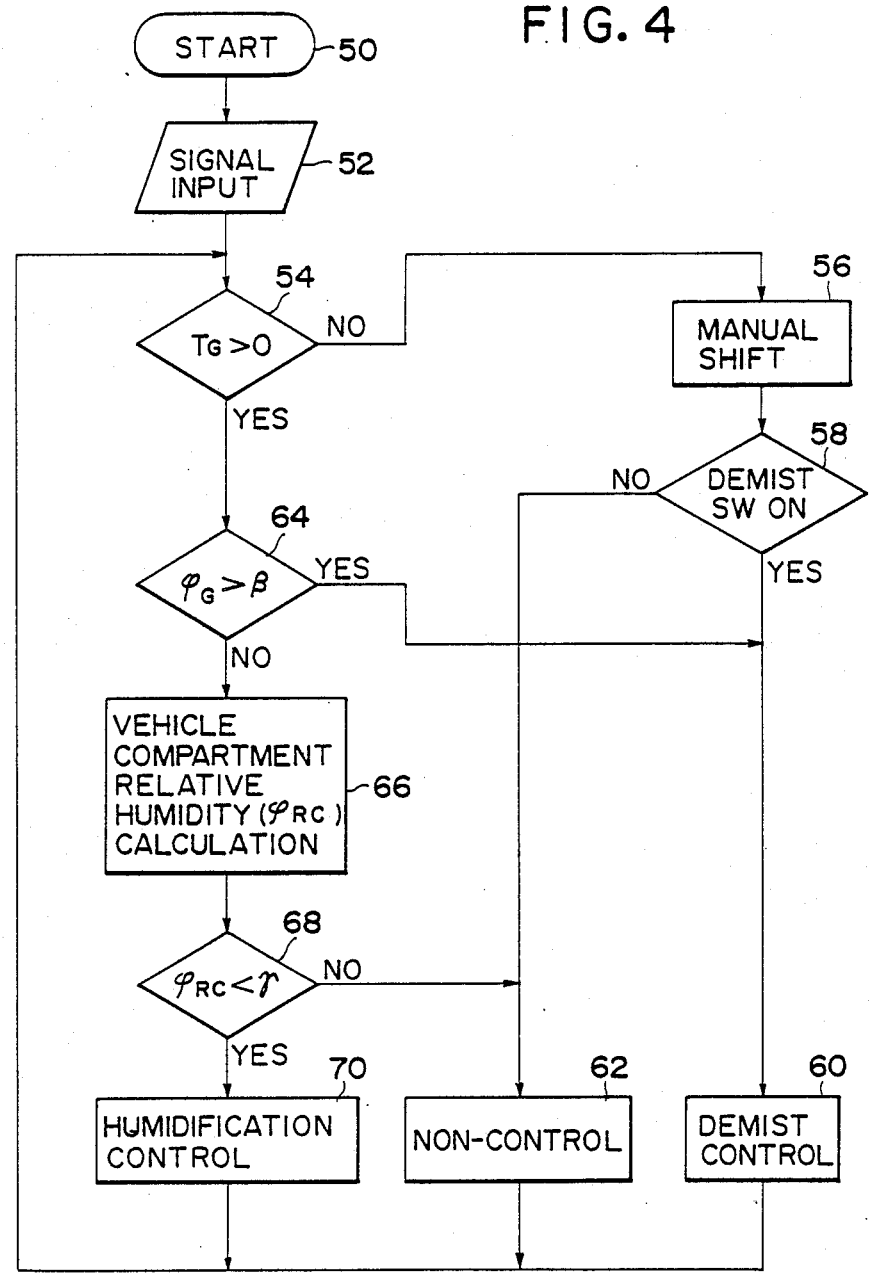
FIG. 4 is a flowchart illustrative of a control routine achieved by a microcomputer in the control apparatus of FIG. 3 for controlling the humidity in a vehicle compartment.

The operation of the microcomputer 24 will be described below with reference to a flowchart shown in FIG. 4 in which is shown a control routine achieved by the microcomputer 24 for controlling the humidity in the vehicle compartment 18. The control routine of the microcomputer 24 starts in a step 50 in accordance with a program stored in the microcomputer 24. In the next step 52, the output signals from the various sensors such as the windowpane humidity sensor 25 are inputted through the A/D converter 30 into the microcomputer 24 and stored in the prescribed areas of the RAM.

Thereafter, a judgment is made in a step 54 to determine whether the temperature (TG) of the inside surface of the windshield 20 detected by the windowpane temperature sensor 26 is higher than 0° C. If the temperature (TG) is lower than 0° C., this means that the inside surface of the windshield 20 is frozen and hence the detection of the humidity on the inside surface of the windshield 20 is not possible. Thus the control goes to a step 56 to shift the humidity control into a manual mode. Then a judgment is made in a step 58 to determine whether the demisting of the vehicle compartment 18 is needed. This judgment is made based on the state of the demist switch 31, i.e. whether or not the demist switch 31 is turned on by the occupant of the vehicle compartment 18. If the demist switch 31 is turned on, then the control proceeds to a step 60 to operate the compressor 9 for controlling the humidity of the vehicle compartment 18 at the demist mode. Conversely, if the judgment in the step 60 indicates the off state of the demist switch 31, the control goes to a step 62 to set the humidity control of the vehicle compartment in the noncontrol mode. When the windshield 20 is demisted, the relative humidity in the vehicle compartment is lowered. With this humidity drop in view, the present invention seeks to adjust the humidity in the vehicle compartment 18 by controlling the relative humidity on the inside surface of the windowpanes (the windshield 20, in particular). For instance, when the vehicle compartment temperature (TR) is maintained at 25° C., the demist control operation causes the relative humidity in the vehicle compartment to drop below a level indicated by the line A shown in FIG. 5.

If the judgment in the step 54 indicates that the temperature TG of the inside surface of the windshield 20 is greater than 0° C., then the control goes to a step 64 in which a judgment is made to determine whether the humidity $\psi G$ on the inside surface of the windshield 20 detected by the windowpane humidity sensor 20 is greater than a predetermined value $\beta$. This value $\beta$ represents a reference humidity at which condensation of water vapour in the air in the vehicle compartment 18 begins to thereby mist the windshield 20. If $\psi G > \beta$, the demist control operation is achieved in the step 60 in preference to any other operation, thereby removing the condensed tiny droplets from the inside surface of the windshield 20. Conversely, if $\psi G < \beta$, the control proceeds to a step 66.

Figure 6:
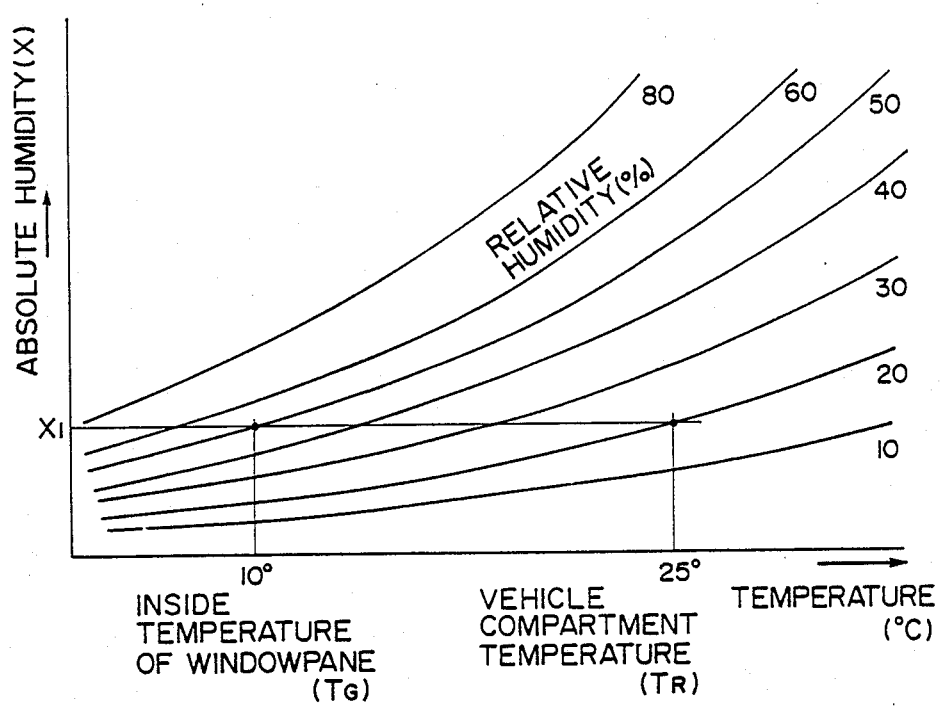
FIG. 6 is a moist air diagram used for conversion of the relative humidity in the vehicle compartment.

In the step 66, the relative humidity $\psi RC$ of the air in the vehicle compartment 18 is calculated from the humidity $\psi G$ on the inside surface of the windshield 20, the temperature TG of the inside surface of the windshield 20 and the vehicle compartment temperature TR. This calculation is carried out in the manner described below, by utilizing a moist air diagram such as shown in FIG. 6. If the inside temperature TG of the windshield 20 is 10° C. and the relative humidity $\psi G$ on the inside surface of the windshield is 50% RH, the absolute humidity X has a value X1. In order to obtain this absolute humidity X1, the relative humidity $\psi RC$ (20% RH in the illustrated example) is calculated from the vehicle compartment temperature TR of 25° C.

After the calculation of the relative humidity $\psi RC$ in the vehicle compartment 18 in the step 66, the control goes to a step 68 for making a judgment as to whether the thus calculated $\psi RC$ is smaller than a predetermined value $\nu$. If $\psi RC > \nu$, this means that the air in the vehicle compartment is not exceedingly dry and hence humidification is not necessary. Accordingly, the control proceeds to the step 62 and the humidity control operation is no longer achieved. If $\psi RC < \nu$, the control goes to a step 70 for increasing the moisture content in the air in the vehicle compartment 18. For this humidification, the humidifier 32 is started and, if necessary, the intake door changeover device 2 is actuated to cause the recirculated air to be drawn into the duct 1 for maintain the vehicle compartment temperature TR above a predetermined value $\alpha$. With this humidification, the relative humidity in the vehicle compartment 18 is maintained above a level indicated by the line B in FIG. 5 when the vehicle compartment temperature TR is 25° C.

Figure 5:
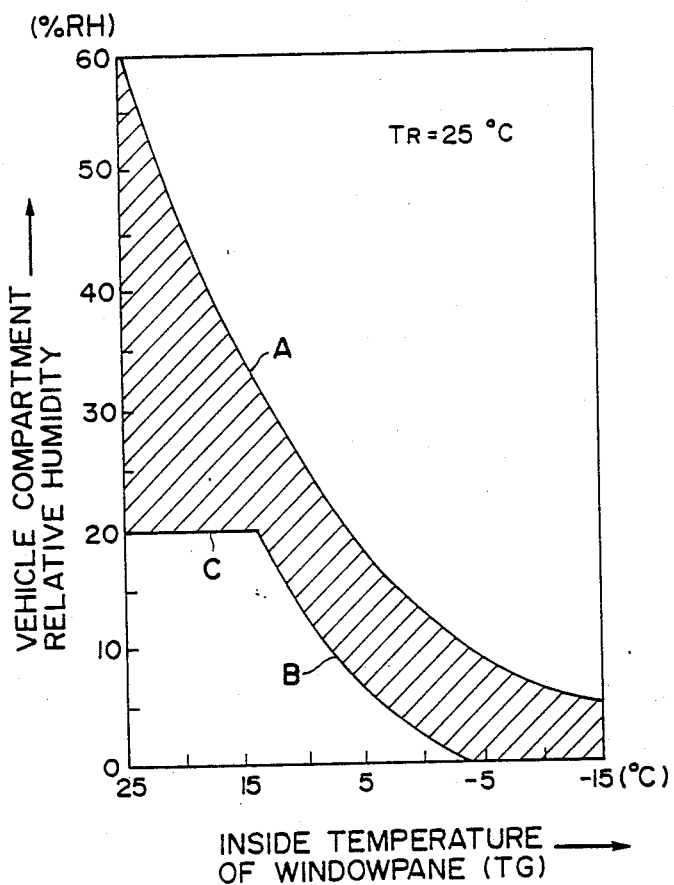
FIG. 5 is a graphical representation of performance curves showing a correlation between the relative humidity in the vehicle compartment at a temperature of 25° C. and the temperature of the inside surface of the windowpane.

In case where the difference between the inside surface temperature TG of the windshield 20 and the vehicle compartment temperature TR is small, a lower reference value is kept constant as at 20% RH, for example, as indicated by the line C shown in FIG. 5, thereby enabling the humidity control operation. After the steps 60, 62 and 70, the control returns to the step 54 and the above-mentioned successive steps of controlling operation are repeated.

With this control, the humidity in the vehicle compartment can be maintained in a range indicated by hatching as shown in FIG. 5, without the necessity of providing a sensor for detecting the humidity of the air in the vehicle compartment. As a result, unpleasant over-humidification and under-humidation can be avoided. Since the lower limit (indicated by the line B) for the relative humidity in the vehicle compartment is calculated based on the inside surface temperature of the windshield 20, there is provided a relatively large difference between the lower limit and the upper limit (indicated by the line A) of the relative humidity in the vehicle compartment. With this relatively wide control range, it is possible to prevent the hunting between the demist control operation and the humidification control operation.

Figure 7:
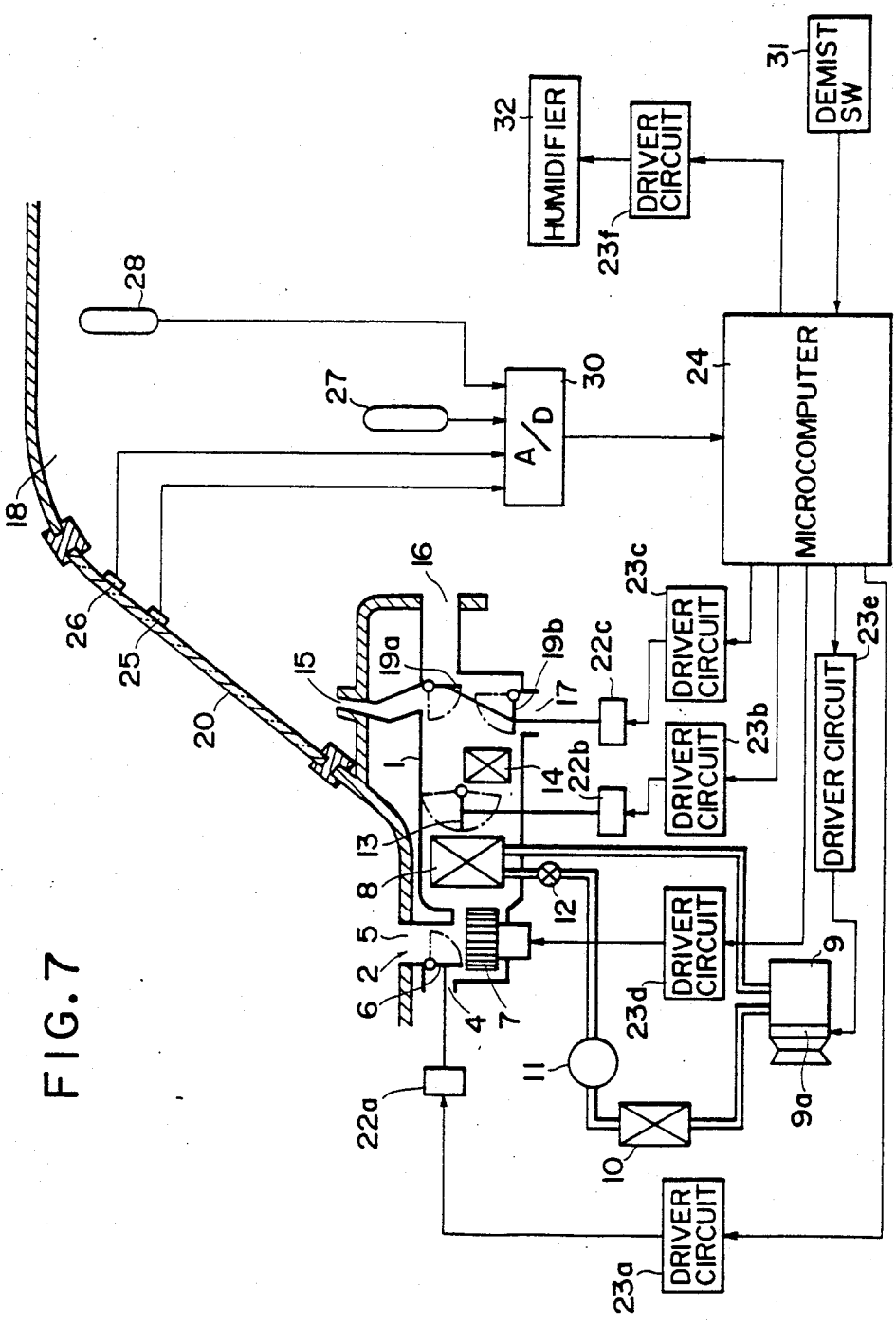
FIG. 7 is a view similar to FIG. 3, but illustrating the modified control apparatus shown in FIG. 4.
Figure 8:
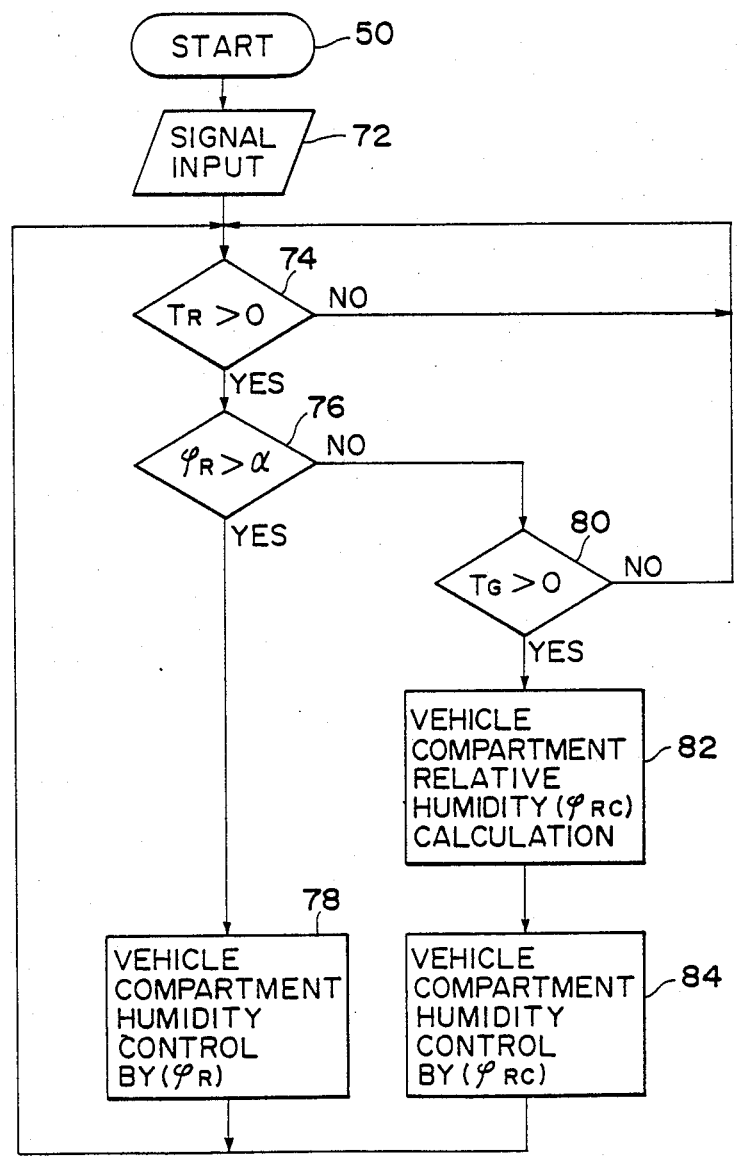
FIG. 8 is a flowchart illustrative of a control routine achieved by a microcomputer of the control apparatus of FIG. 7 for controlling the humidity in a vehicle compartment.

FIGS. 7 and 8 show a modified control apparatus according to another embodiment of the present invention. Those parts which are identical to the parts of the control apparatus shown in FIGS. 3 and 4 are designated by the same reference characters. The modified control apparatus is similar to the control apparatus of the first embodiment but differs therefrom in that there is provided a vehicle compartment humidity sensor 28 for detecting the humidity of the air in the vehicle compartment 18. The output from the vehicle compartment humidity sensor 28 is inputted to an A/D converter 30 which in turn supplies digital signals to a microcomputer 24 for controlling the humidity in the vehicle compartment 18. The operation of the microcomputer 24 will be described below with reference to a flowchart shown in FIG. 8.

The control routine of the microcomputer 24 starts in a step 50 and in the next following step 72, various signals including a signal representing the vehicle compartment humidity $\psi R$ are inputted from the respective sensors 25-28 to the microcomputer 24. Thereafter, a judgment is made to determine whether the vehicle compartment temperature TR is higher than 0° C. or not in a step 74. If yes, the control goes to a step 76. Conversely, if the temperature TR is lower than 0° C., then the humidity control of the vehicle compartment is not commenced and the control returns to the step 74. The judgment step 74 is effected for enabling the detection of the humidity in the vehicle compartment which would otherwise become impossible when the water vapour in the air is frozen at a temperature below 0° C.

In the step 76, a judgment is made to determine whether the vehicle compartment humidity $\psi R$ detected by the vehicle compartment humidity sensor 28 is higher than a predetermined value $\alpha$. This judgment is incorporated because the humidity sensor is likely to become inresponsive to the relative humidity below 40% RH and hence issue inaccurate output signals. To this end, the validity of the detected value $\psi R$ is compared with the predetermined value and if $\psi R > \alpha$, this means that the output signal from the vehicle compartment humidity sensor 28 can be used for the humidity control operation and hence the control goes to a step 78 for achieving a humidity control of the vehicle compartment based on $\psi R$.

If $\psi R < \alpha$, then the control proceeds to a step 80 in which a judgment is made to determine whether the inside surface temperature TG of the windshield 20 is higher than 0° C. If the temperature TG is below 0° C., this means that an automatic humidity control based on the detection of the humidity on the inside surface of the windshield 20 is not possible and hence the control returns to the step 74. Conversely, if TG>0, then the control proceeds to a step 82 for calculating the relative humidity ψRC in the vehicle compartment 18 in the same manner as done in the step 66 of the first embodiment described with reference to FIG. 4. Instead of the output value ψR of the vehicle compartment humidity sensor 28, the thus calculated relative humidity ψRC is used for controlling the humidity in the vehicle compartment 18 in a step 84.

After the steps 78 and 84, the control returns to the step 74.

According to the humidity control of the second embodiment described above, the output value ψR of the vehicle compartment humidity sensor 28 can be used as a reference value for the control of the humidity in the vehicle compartment, so long as the humidity in the vehicle compartment is in a reliably detectable range of the vehicle compartment humidity sensor 28. On the other hand, when the humidity in the vehicle compartment is not higher than the detectable range, then the humidity control is achieved based on the value ψRC calculated in the step 82. Thus, a wide range humidity control can be achieved. Since the output value ψR of the vehicle compartment humidity sensor 28 is used as much as possible, the accuracy of the calculated value ψRC is not so critical as in the case of first embodiment. Consequently, the humidity control achieved by the second embodiment is more accurate than the humidity control of the first embodiment which is achieved based solely on the calculated value ψRC throughout the range.

Obviously, various modifications and variations of the present invention are possible in the light of the above teaching. It is therefore to be understood that within the scope of the appended claims the invention may be practiced otherwise than the specifically described.

What is claimed is:

1. A control apparatus for an automobile air-conditioner, comprising:
   (a) windowpane humidity detection means for detecting a relative humidity on the inside surface of a windowpane of a motor vehicle;
   (b) mist judgment means for making a judgment, according to the output from said windowpane humidity detection means, to determine whether the inside surface of the windowpane is misted or not;
   (c) windowpane temperature detection means for detecting a temperature of the inside surface of the windowpane;
   (d) vehicle compartment temperature detection means for detecting a temperature of the air inside the vehicle compartment;
   (e) vehicle compartment humidity calculation means for calculating a relative humidity in the vehicle compartment by conversion from the relative humidity on the inside surface of the windowpane, the temperature of the inside surface of the windowpane and the temperature of the air in the vehicle compartment;
   (f) humidification demand judgment means for making a judgment as to whether the relative humidity calculated by said vehicle compartment humidity calculation means is lower than a predetermined humidity; and
   (g) control mean for controlling said air-conditioner to achieve a demist operation if the judgment by said mist judgment means indicates the misted state of the inside surface of the windowpane, and to achieve a humidifying operation if the judgment by said mist judgment means indicates the non-misted state of the inside surface of the windowpane and the judgment by said humidication demand judgment means indicates the relative humidity in the vehicle compartment which is lower than said predetermined humidity.

2. A control apparatus for an automobile air-conditioner, comprising:
   (a) vehicle compartment humidity detection means for detecting a relative humidity of the air in a vehicle compartment;
   (b) a validity judgment means for making a judgment as to whether an output value from said vehicle compartment humidity detection means is in a valid detection range;
   (c) windowpane humidity detection means for detecting a relative humidity on the inside surface of a windowpane of a motor vehicle;
   (d) windowpane temperature detection means for detecting a temperature of the inside surface of the windowpane;
   (e) vehicle compartment temperature detection means for detecting a temperature of the air inside the vehicle compartment;
   (f) vehicle compartment humidity calculation means for calculating a relative humidity in the vehicle compartment by conversion from the relative humidity on the inside surface of the windowpane, the temperature of the inside surface of the windowpane and the vehicle compartment temperature;
   (g) selection means for selecting the output value from the vehicle compartment humidity detecting means if the judgment by said validity judgment means indicates that the output from said vehicle compartment humidity detection means is in the valid detection range and for selecting the result of calculation by said vehicle compartment humidity calculation means if the judgment by said validity judgment means indicates that the output from said vehicle compartment humidity detection means is out of the valid detection range; and
   (h) control means for controlling said air-conditioner to achieve a humidity control operation based on the result of selection by said selection means.

* * * * *